US007188219B2

(12) United States Patent
Jeddeloh (10) Patent No.: US 7,188,219 B2
(45) Date of Patent: Mar. 6, 2007

(54) BUFFER CONTROL SYSTEM AND METHOD FOR A MEMORY SYSTEM HAVING OUTSTANDING READ AND WRITE REQUEST BUFFERS

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 299 days.

(21) Appl. No.: 10/769,079

(22) Filed: Jan. 30, 2004

(65) Prior Publication Data

US 2005/0172084 A1    Aug. 4, 2005

(51) Int. Cl.
*G11C 7/10* (2006.01)
*G06F 13/14* (2006.01)

(52) U.S. Cl. ..................... 711/154; 710/310
(58) Field of Classification Search ................ 711/154, 711/156; 710/54, 56, 57; 345/558
See application file for complete search history.

(56) References Cited

U.S. PATENT DOCUMENTS

| | | | |
|---|---|---|---|
| 4,045,781 A | 8/1977 | Levy et al. ................ | 364/200 |
| 4,240,143 A | 12/1980 | Besemer et al. ........... | 364/200 |
| 4,245,306 A | 1/1981 | Besemer et al. ........... | 364/200 |
| 4,253,144 A | 2/1981 | Bellamy et al. ........... | 364/200 |
| 4,253,146 A | 2/1981 | Bellamy et al. ........... | 364/200 |
| 4,608,702 A | 8/1986 | Hirzel et al. .............. | 375/110 |
| 4,707,823 A | 11/1987 | Holdren et al. ............ | 370/1 |
| 4,724,520 A | 2/1988 | Athanas et al. ........... | 364/200 |
| 4,891,808 A | 1/1990 | Williams .................. | 370/112 |
| 4,930,128 A | 5/1990 | Suzuki et al. ............. | 371/12 |
| 4,953,930 A | 9/1990 | Ramsey et al. .......... | 350/96.11 |
| 5,241,506 A | 8/1993 | Motegi et al. ............. | 365/210 |
| 5,243,703 A | 9/1993 | Farmwald et al. ......... | 395/325 |
| 5,251,303 A | 10/1993 | Fogg, Jr. et al. ........... | 395/275 |
| 5,269,022 A | 12/1993 | Shinjo et al. .............. | 395/700 |
| 5,317,752 A | 5/1994 | Jewett et al. .............. | 395/750 |
| 5,319,755 A | 6/1994 | Farmwald et al. ......... | 395/325 |
| 5,327,553 A | 7/1994 | Jewett et al. .............. | 395/575 |
| 5,355,391 A | 10/1994 | Horowitz et al. .......... | 375/36 |

(Continued)

FOREIGN PATENT DOCUMENTS

EP     0849685 A2     6/1998

(Continued)

OTHER PUBLICATIONS

Hellwagner, Hermann, Karl Wolfgang and Markus Leberecht, "Enabling a PC Cluster for High-Performance Computing," Jun. 1997, The SPEEDUP Journal, vol. 11, No. 1, p. 4.*

(Continued)

*Primary Examiner*—Brian R. Peugh
*Assistant Examiner*—James Golden
(74) *Attorney, Agent, or Firm*—Dorsey & Whitney LLP (57) ABSTRACT

A memory controller and method for managing the issuance of read and write requests to a system memory is provided. The number of outstanding read requests and write requests issued to the system memory are separately monitored and further issuance of read and write requests to the system memory is separately controlled based on the number of outstanding read and write requests, respectively. For example, the issuance of read and write requests can be managed by independently halting and resuming the issuance of read and write requests to the system memory to maintain the number of outstanding read requests between first and second read thresholds and to maintain the number of outstanding write requests between first and second write thresholds, respectively.

81 Claims, 4 Drawing Sheets

U.S. PATENT DOCUMENTS

| | | | |
|---|---|---|---|
| 5,432,823 A | 7/1995 | Gasbarro et al. | 375/356 |
| 5,432,907 A | 7/1995 | Picazo, Jr. et al. | 395/200 |
| 5,442,770 A | 8/1995 | Barratt | 395/403 |
| 5,461,627 A | 10/1995 | Rypinski | 370/95.2 |
| 5,465,229 A | 11/1995 | Bechtolsheim et al. | 345/477 |
| 5,479,370 A | 12/1995 | Furuyama et al. | 365/189.12 |
| 5,497,476 A | 3/1996 | Oldfield et al. | 395/439 |
| 5,502,621 A | 3/1996 | Schumacher et al. | 361/760 |
| 5,544,319 A | 8/1996 | Acton et al. | 395/200.07 |
| 5,566,325 A | 10/1996 | Bruce, II et al. | 395/494 |
| 5,577,220 A | 11/1996 | Combs et al. | 395/416 |
| 5,581,767 A | 12/1996 | Katsuki et al. | 395/800 |
| 5,606,717 A | 2/1997 | Farmwald et al. | 395/856 |
| 5,638,334 A | 6/1997 | Farmwald et al. | 365/230.03 |
| 5,638,534 A | 6/1997 | Mote, Jr. | 395/485 |
| 5,659,798 A | 8/1997 | Blumrich et al. | 395/846 |
| 5,706,224 A | 1/1998 | Srinivasan et al. | 365/49 |
| 5,715,456 A | 2/1998 | Bennett et al. | 395/652 |
| 5,729,709 A | 3/1998 | Harness | 395/405 |
| 5,748,616 A | 5/1998 | Riley | 370/242 |
| 5,796,413 A | 8/1998 | Shipp et al. | 345/522 |
| 5,818,844 A | 10/1998 | Singh et al. | 370/463 |
| 5,819,304 A | 10/1998 | Nilsen et al. | 711/5 |
| 5,822,255 A | 10/1998 | Uchida | 365/194 |
| 5,832,250 A | 11/1998 | Whittaker | 395/471 |
| 5,875,352 A | 2/1999 | Gentry et al. | 395/843 |
| 5,875,454 A | 2/1999 | Craft et al. | 711/113 |
| 5,887,159 A | 3/1999 | Burrows | 395/567 |
| 5,928,343 A | 7/1999 | Farmwald et al. | 710/104 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,023,726 A | 2/2000 | Saksena | 709/219 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,061,263 A | 5/2000 | Boaz et al. | 365/51 |
| 6,061,296 A | 5/2000 | Ternullo, Jr. et al. | 365/233 |
| 6,067,262 A | 5/2000 | Irrinki et al. | 365/201 |
| 6,073,190 A | 6/2000 | Rooney | 710/56 |
| 6,076,139 A | 6/2000 | Welker et al. | 711/104 |
| 6,079,008 A | 6/2000 | Clery, III | 712/11 |
| 6,092,158 A | 7/2000 | Harriman et al. | 711/151 |
| 6,098,158 A | 8/2000 | Lay et al. | 711/162 |
| 6,105,075 A | 8/2000 | Ghaffari | 710/5 |
| 6,125,431 A | 9/2000 | Kobayashi | 711/154 |
| 6,128,703 A | 10/2000 | Bourekas et al. | 711/138 |
| 6,128,706 A | 10/2000 | Bryg et al. | 711/141 |
| 6,131,149 A | 10/2000 | Lu et al. | 711/167 |
| 6,134,624 A | 10/2000 | Burns et al. | 710/131 |
| 6,137,709 A | 10/2000 | Boaz et al. | 365/51 |
| 6,144,587 A | 11/2000 | Yoshida | 365/189.05 |
| 6,145,033 A * | 11/2000 | Chee | 710/57 |
| 6,157,743 A * | 12/2000 | Goris et al. | 382/233 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,185,676 B1 | 2/2001 | Poplingher et al. | 712/239 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,208,180 B1 | 3/2001 | Fisch et al. | 327/141 |
| 6,212,590 B1 * | 4/2001 | Melo et al. | 710/119 |
| 6,219,725 B1 | 4/2001 | Diehl et al. | 710/26 |
| 6,223,301 B1 | 4/2001 | Santeler et al. | 714/6 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,256,692 B1 | 7/2001 | Yoda et al. | 710/104 |
| 6,272,609 B1 | 8/2001 | Jeddeloh | 711/169 |
| 6,285,349 B1 | 9/2001 | Smith | 345/147 |
| 6,286,083 B1 | 9/2001 | Chin et al. | 711/151 |
| 6,294,937 B1 | 9/2001 | Crafts et al. | 327/158 |
| 6,301,637 B1 | 10/2001 | Krull et al. | 711/112 |
| 6,327,642 B1 | 12/2001 | Lee et al. | 711/120 |
| 6,330,205 B2 | 12/2001 | Shimizu et al. | 365/230.06 |
| 6,347,055 B1 | 2/2002 | Motomura | 365/189.05 |
| 6,349,363 B2 | 2/2002 | Cai et al. | 711/129 |
| 6,356,573 B1 | 3/2002 | Jonsson et al. | 375/46 |
| 6,367,074 B1 | 4/2002 | Bates et al. | 717/11 |
| 6,370,068 B2 | 4/2002 | Rhee | 365/196 |
| 6,370,611 B1 | 4/2002 | Callison et al. | 711/105 |
| 6,373,777 B1 | 4/2002 | Suzuki | 365/230.03 |
| 6,381,190 B1 | 4/2002 | Shinkai | 365/230.03 |
| 6,389,514 B1 | 5/2002 | Rokicki | 711/136 |
| 6,392,653 B1 | 5/2002 | Malandain et al. | 345/501 |
| 6,401,213 B1 | 6/2002 | Jeddeloh | 713/401 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,433,785 B1 | 8/2002 | Garcia et al. | 345/531 |
| 6,434,639 B1 | 8/2002 | Haghighi | 710/39 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,393 B1 | 9/2002 | Holman et al. | 711/154 |
| 6,460,108 B1 * | 10/2002 | McCoskey et al. | 710/57 |
| 6,460,114 B1 | 10/2002 | Jeddeloh | 711/120 |
| 6,462,978 B2 | 10/2002 | Shibata et al. | 365/63 |
| 6,463,059 B1 | 10/2002 | Movshovich et al. | 370/389 |
| 6,470,422 B2 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 | 11/2002 | Leddige et al. | 711/5 |
| 6,477,621 B1 | 11/2002 | Lee et al. | 711/120 |
| 6,479,322 B2 | 11/2002 | Kawata et al. | 438/109 |
| 6,487,628 B1 * | 11/2002 | Duong et al. | 710/313 |
| 6,490,188 B2 | 12/2002 | Nuxoll et al. | 365/63 |
| 6,493,803 B1 | 12/2002 | Pham et al. | 711/147 |
| 6,496,193 B1 | 12/2002 | Surti et al. | 345/552 |
| 6,496,909 B1 | 12/2002 | Schimmel | 711/163 |
| 6,501,471 B1 | 12/2002 | Venkataraman et al. | 345/424 |
| 6,505,287 B2 | 1/2003 | Uematsu | 711/170 |
| 6,523,092 B1 | 2/2003 | Fanning | 711/134 |
| 6,523,093 B1 | 2/2003 | Bogin et al. | 711/137 |
| 6,526,483 B1 | 2/2003 | Cho et al. | 711/154 |
| 6,539,490 B1 | 3/2003 | Forbes et al. | 713/401 |
| 6,552,564 B1 | 4/2003 | Forbes et al. | 326/30 |
| 6,564,329 B1 | 5/2003 | Cheung et al. | 713/322 |
| 6,565,329 B2 | 5/2003 | Yokomachi et al. | 417/269 |
| 6,587,912 B2 | 7/2003 | Leddige et al. | 711/5 |
| 6,590,816 B2 | 7/2003 | Perner | 365/200 |
| 6,594,713 B1 | 7/2003 | Fuoco et al. | 710/31 |
| 6,594,722 B1 | 7/2003 | Willke, II et al. | 710/313 |
| 6,598,154 B1 | 7/2003 | Vaid et al. | 712/237 |
| 6,615,325 B2 | 9/2003 | Mailloux et al. | 711/154 |
| 6,622,227 B2 | 9/2003 | Zumkehr et al. | 711/167 |
| 6,628,294 B1 | 9/2003 | Sadowsky et al. | 345/568 |
| 6,629,220 B1 | 9/2003 | Dyer | 711/158 |
| 6,631,440 B2 | 10/2003 | Jenne et al. | 711/105 |
| 6,633,959 B2 | 10/2003 | Arimilli et al. | 711/141 |
| 6,636,110 B1 | 10/2003 | Ooishi et al. | 327/565 |
| 6,646,929 B1 | 11/2003 | Moss et al. | 365/194 |
| 6,647,470 B1 | 11/2003 | Janzen | 711/154 |
| 6,658,509 B1 | 12/2003 | Bonella et al. | 710/100 |
| 6,662,304 B2 | 12/2003 | Keeth et al. | 713/400 |

| Patent/Pub No. | Date | Inventor | Class |
|---|---|---|---|
| 6,665,202 B2 | 12/2003 | Lindahl et al. | 365/49 |
| 6,667,895 B2 | 12/2003 | Jang et al. | 365/63 |
| 6,681,292 B2 | 1/2004 | Creta et al. | 711/119 |
| 6,697,926 B2 | 2/2004 | Johnson et al. | 711/167 |
| 6,704,817 B1 * | 3/2004 | Steinman et al. | 710/100 |
| 6,715,018 B2 | 3/2004 | Farnworth et al. | 710/300 |
| 6,718,440 B2 | 4/2004 | Maiyuran et al. | 711/137 |
| 6,721,195 B2 | 4/2004 | Brunelle et al. | 365/63 |
| 6,724,685 B2 | 4/2004 | Braun et al. | 365/233 |
| 6,728,800 B1 | 4/2004 | Lee et al. | 710/54 |
| 6,735,679 B1 | 5/2004 | Herbst et al. | 711/167 |
| 6,735,682 B2 | 5/2004 | Segelken et al. | 711/220 |
| 6,745,275 B2 | 6/2004 | Chang | 710/305 |
| 6,751,703 B2 | 6/2004 | Chilton | 711/113 |
| 6,754,812 B1 | 6/2004 | Abdallah et al. | 712/234 |
| 6,756,661 B2 | 6/2004 | Tsuneda et al. | 257/673 |
| 6,760,833 B1 | 7/2004 | Dowling | 712/34 |
| 6,771,538 B2 | 8/2004 | Shukuri et al. | 365/185.05 |
| 6,772,295 B2 | 8/2004 | Spencer et al. | 711/137 |
| 6,775,747 B2 | 8/2004 | Venkatraman | 711/137 |
| 6,789,173 B1 | 9/2004 | Tanaka et al. | 711/147 |
| 6,792,059 B2 | 9/2004 | Yuan et al. | 375/354 |
| 6,792,496 B2 | 9/2004 | Aboulenein et al. | 710/306 |
| 6,795,899 B2 | 9/2004 | Dodd et al. | 711/137 |
| 6,799,246 B1 | 9/2004 | Wise et al. | 711/117 |
| 6,799,268 B1 | 9/2004 | Boggs et al. | 712/228 |
| 6,804,760 B2 | 10/2004 | Wiliams | 711/170 |
| 6,804,764 B2 | 10/2004 | LaBerge et al. | 711/170 |
| 6,807,630 B2 | 10/2004 | Lay et al. | 713/2 |
| 6,811,320 B1 | 11/2004 | Abbott | 385/58 |
| 6,816,947 B1 | 11/2004 | Huffman | 711/151 |
| 6,820,181 B2 | 11/2004 | Jeddeloh et al. | 711/169 |
| 6,821,029 B1 | 11/2004 | Grung et al. | 385/92 |
| 6,823,023 B1 | 11/2004 | Hannah | 375/296 |
| 6,829,705 B2 | 12/2004 | Smith | 713/1 |
| 6,845,409 B1 | 1/2005 | Talagala et al. | 710/20 |
| 6,889,304 B2 | 5/2005 | Perego et al. | 711/170 |
| 6,910,109 B2 | 6/2005 | Holman et al. | 711/156 |
| 2001/0039612 A1 | 11/2001 | Lee | 713/2 |
| 2002/0112119 A1 | 8/2002 | Halbert et al. | 711/115 |
| 2002/0116588 A1 | 8/2002 | Beckert et al. | |
| 2002/0144064 A1 | 10/2002 | Famming | 711/144 |
| 2002/0178319 A1 | 11/2002 | Sanchez-Olea | 710/305 |
| 2003/0005223 A1 | 1/2003 | Coulson et al. | 711/118 |
| 2003/0043158 A1 | 3/2003 | Wasserman et al. | 345/545 |
| 2003/0043426 A1 | 3/2003 | Baker et al. | 359/109 |
| 2003/0093630 A1 | 5/2003 | Richard et al. | 711/154 |
| 2003/0149809 A1 | 8/2003 | Jensen et al. | 710/22 |
| 2003/0163649 A1 | 8/2003 | Kapur et al. | 711/146 |
| 2003/0177320 A1 | 9/2003 | Sah et al. | 711/158 |
| 2003/0193927 A1 | 10/2003 | Hronik | 370/351 |
| 2003/0217223 A1 | 11/2003 | Nino, Jr. et al. | 711/105 |
| 2003/0227798 A1 | 12/2003 | Pax | 365/189.12 |
| 2003/0229762 A1 | 12/2003 | Maiyuran et al. | 711/137 |
| 2003/0229770 A1 | 12/2003 | Jeddeloh | 711/213 |
| 2004/0019728 A1 | 1/2004 | Sharma | 710/306 |
| 2004/0022094 A1 | 2/2004 | Radhakrishnan et al. | 365/200 |
| 2004/0044833 A1 | 3/2004 | Ryan | 711/5 |
| 2004/0064602 A1 | 4/2004 | George | 710/22 |
| 2004/0122988 A1 * | 6/2004 | Han et al. | 710/5 |
| 2004/0126115 A1 | 7/2004 | Levy et al. | 398/116 |
| 2004/0144994 A1 | 7/2004 | Lee et al. | 257/200 |
| 2004/0158677 A1 * | 8/2004 | Dodd | 711/118 |
| 2004/0236885 A1 | 11/2004 | Fredriksson et al. | 710/100 |
| 2005/0044327 A1 | 2/2005 | Howard et al. | 711/147 |
| 2005/0071542 A1 | 3/2005 | Weber et al. | 711/105 |

FOREIGN PATENT DOCUMENTS

| | | |
|---|---|---|
| JP | 2001265539 A | 9/2001 |
| WO | WO 93/19422 | 9/1993 |
| WO | WO 02/27499 A2 | 4/2002 |

OTHER PUBLICATIONS

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

Intel, "Flash Memory PCI Add-In Card for Emdbedded Systems", Application Note AP-758, Sep. 1997, pp. i-13.

Stanley, T. et al., "PCI System Architecture", Third Edition, Mindshare, Inc., 1995, pp. 24-25.

Intel, "Intel 840 Chipset: 82840 Memory Controller Hub (MCH)", Datasheet, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

* cited by examiner

BUFFER CONTROL SYSTEM AND METHOD FOR A MEMORY SYSTEM HAVING OUTSTANDING READ AND WRITE REQUEST BUFFERS

TECHNICAL FIELD

The present invention is related generally to memory controllers for controlling a memory system, and more particularly, related to memory controllers for managing a memory system having memory request buffers.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The memory devices of the system memory, typically arranged in memory modules having multiple memory devices, are coupled through a memory bus to the memory controller. The processor issues a memory request, which includes a memory command, such as a read command, and an address designating the location from which data or instructions are to be read. The memory controller uses the command and address to generate appropriate command signals as well as row and column addresses, which are applied to the system memory through the memory bus. In response to the commands and addresses, data are transferred between the system memory and the processor. The memory controller is often part of a system controller, which also includes bus bridge circuitry for coupling the processor bus to an expansion bus, such as a PCI bus.

In memory systems, high data bandwidth is desirable. Generally, bandwidth limitations are not related to the memory controllers since the memory controllers sequence data to and from the system memory as fast as the memory devices allow. One approach that has been taken to increase bandwidth is to increase the speed of the memory data bus coupling the memory controller to the memory devices. Thus, the same amount of information can be moved over the memory data bus in less time. However, despite increasing memory data bus speeds, a corresponding increase in bandwidth does not result. One reason for the non-linear relationship between data bus speed and bandwidth is the hardware limitations within the memory devices themselves. That is, the memory controller has to schedule all memory commands to the memory devices such that the hardware limitations are honored. Although these hardware limitations can be reduced to some degree through the design of the memory device, a compromise must be made because reducing the hardware limitations typically adds cost, power, and/or size to the memory devices, all of which are undesirable alternatives. Thus, given these constraints, although it is easy for memory devices to move "well-behaved" traffic at ever increasing rates, for example, sequel traffic to the same page of a memory device, it is much more difficult for the memory devices to resolve "badly-behaved traffic," such as bouncing between different pages or banks of the memory device. As a result, the increase in memory data bus bandwidth does not yield a corresponding increase in information bandwidth.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices. Increasing the memory data bus speed can be used to help alleviate the latency issue. However, as with bandwidth, the increase in memory data bus speeds do not yield a linear reduction of latency, for essentially the same reasons previously discussed.

Although increasing memory data bus speed has, to some degree, been successful in increasing bandwidth and reducing latency, other issues are raised by this approach. For example, as the speed of the memory data bus increases, loading on the memory bus needs to be decreased in order to maintain signal integrity since traditionally, there has only been wire between the memory controller and the memory slots into which the memory modules are plugged. Several approaches have been taken to accommodate the increase in memory data bus speed. For example, reducing the number of memory slots, adding buffer circuits on a memory module in order to provide sufficient fanout of control signals to the memory devices on the memory module, and providing multiple memory device interfaces on the memory module since there are too few memory module connectors on a single memory device interface. The effectiveness of these conventional approaches are, however, limited. A reason why these techniques were used in the past is that it was cost-effective to do so. However, when only one memory module can be plugged in per interface, it becomes too costly to add a separate memory interface for each required memory slot. In other words, it pushes the system controllers package out of the commodity range and into the boutique range, thereby, greatly adding cost.

One recent approach that allows for increased memory data bus speed in a cost effective manner is the use of multiple memory devices coupled to the processor through a memory hub. In a memory hub architecture, or a hub-based memory sub-system, a system controller or memory controller is coupled over a high speed bi-directional or unidirectional memory controller/hub interface to several memory modules. Typically, the memory modules are coupled in a point-to-point or daisy chain architecture such that the memory modules are connected one to another in series. Thus, the memory controller is coupled to a first memory module, with the first memory module connected to a second memory module, and the second memory module coupled to a third memory module, and so on in a daisy chain fashion.

Each memory module includes a memory hub that is coupled to the memory controller/hub interface and a number of memory devices on the module, with the memory hubs efficiently routing memory requests and responses between the controller and the memory devices over the memory controller/hub interface. Computer systems employing this architecture can use a high-speed memory data bus since signal integrity can be maintained on the memory data bus. Moreover, this architecture also provides for easy expansion of the system memory without concern for degradation in signal quality as more memory modules are added, such as occurs in conventional memory bus architectures.

Although computer systems using memory hubs may provide superior performance, they may often fail to operate at optimum efficiency for a variety of reasons. One such reason is the issue of managing various buffers in the system memory, for example, memory request buffers and read data buffers included in the memory hubs. Typically, the various buffers are used by the individual memory hubs to handle memory requests in a more efficient manner, such as waiting until a sufficient number of outstanding write requests have been issued to the memory hub before servicing them, or for the purpose of efficiently routing read data sent back to a memory controller from upstream memory hubs after the read requests have been serviced. Monitoring the status of the various buffers of the memory system is desirable to prevent issues such as buffer overflow where continuing to issue memory requests may cause memory requests or read data to stall in the system memory. Additionally, managing the use of the various buffers in the memory system may require accommodating different buffer management goals. For example, it is desirable to allow for a large number of write requests to be issued to the system memory, while minimizing the number of outstanding read requests. Therefore, there is a need for a system and method for managing buffers of a system memory.

SUMMARY OF THE INVENTION

A memory controller according to one aspect of the present invention includes a memory request queue to receive and store memory requests where the memory request queue issues read requests and write requests to the system memory in response to a flow control signal. The memory controller further includes a response queue coupled to receive a memory request response having a status signal identifying read requests and write requests that have been serviced by the system memory. Further included in the memory controller is a memory request flow control circuit coupled to the response queue to receive the status signals. The memory request flow control circuit includes separate read and write request monitor circuits to monitor the number of outstanding read and write requests issued to the system memory, respectively. The memory request flow control circuit is also coupled to the memory request queue to provide the flow control signal responsive to the number of outstanding read and write requests to control the issuance of read requests and the issuance of write requests to the system memory.

In another aspect of the invention, a method for managing the issuance of read and write requests to a system memory is provided. The method includes separately monitoring the number of outstanding read requests and write requests issued to the system memory, and separately controlling further issuance of read and write requests to the system memory based on the number of outstanding read and write requests, respectively. In another aspect of the invention, the issuance of read and write requests are managed by independently halting and resuming the issuance of read and write requests to the system memory to maintain the number of outstanding read requests between first and second read thresholds and to maintain the number of outstanding write requests between first and second write thresholds, respectively.

DETAILED DESCRIPTION OF THE INVENTION

Figure 1:
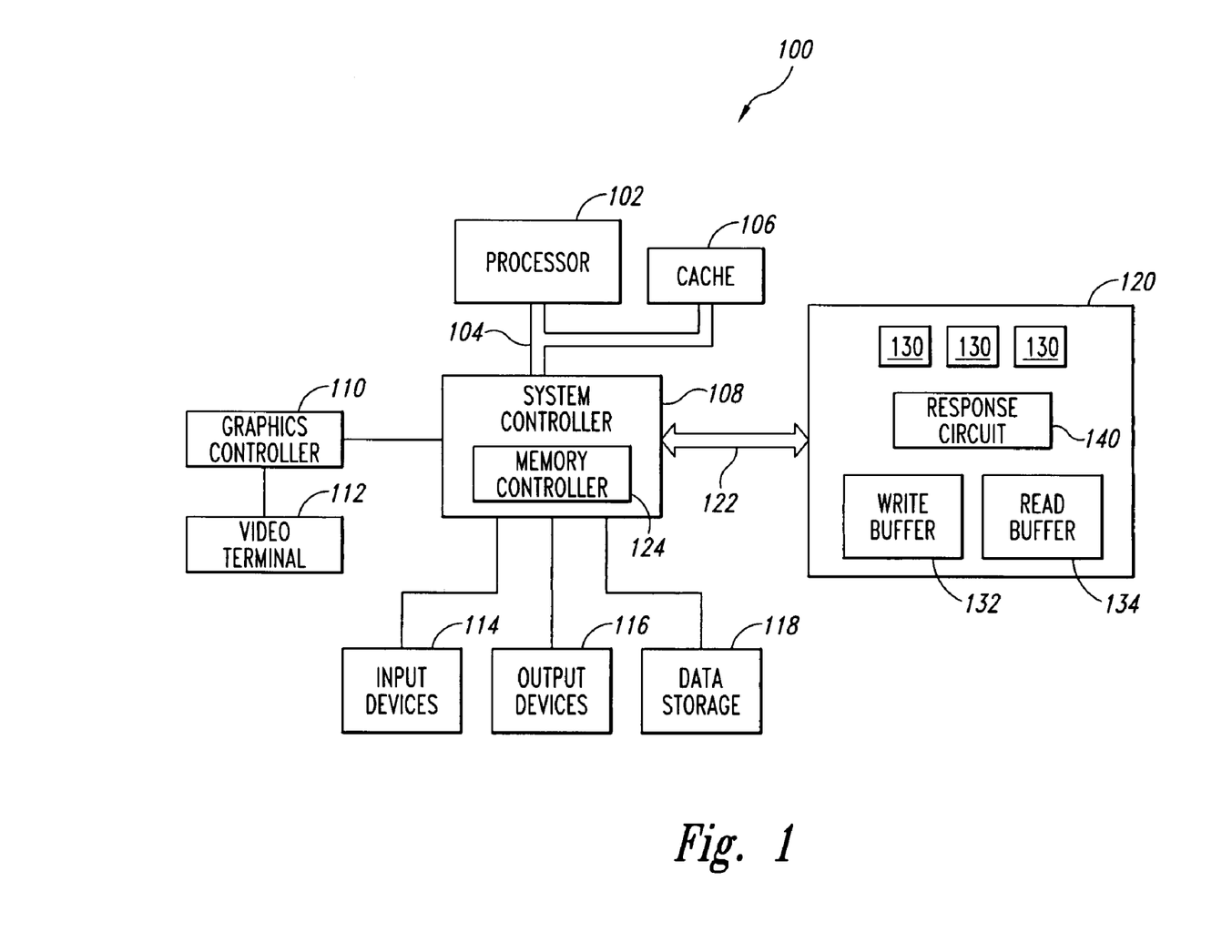
FIG. 1 is a partial block diagram of a computer system in which embodiments of the present invention can be implemented.

FIG. 1 illustrates a computer system 100 according to an embodiment of the present invention. The computer system 100 includes a processor 102 for performing various computing functions, such as executing specific software to perform specific calculations or tasks. The processor 102 includes a processor bus 104 that normally includes an address bus, a control bus, and a data bus. The processor bus 104 is typically coupled to a cache memory 106, which, is typically static random access memory ("SRAM") device. The processor bus 104 is further coupled to a system controller 108, which is also sometimes referred to as a bus bridge. The system controller 108 serves as a communications path to the processor 102 for a variety of other components. As shown in FIG. 1, the system controller 108 includes a graphics port that is typically coupled to a graphics controller 110, which is, in turn, coupled to a video terminal 112. The system controller 108 is also coupled to one or more input devices 114, such as a keyboard or a mouse, to allow an operator to interface with the computer system 100. Typically, the computer system 100 also includes one or more output devices 116, such as a printer, coupled to the processor 102 through the system controller 108. One or more data storage devices 118 are also typically coupled to the processor 102 through the system controller 108 to allow the processor 102 to store data or retrieve data from internal or external storage media (not shown). Examples of typical storage devices 118 include hard and floppy disks, tape cassettes, and compact disk read-only memories (CD-ROMs).

The system controller 108 includes a memory controller 124 that is coupled to the processor 102. The memory controller 124 is also coupled to a system memory 120 through a system memory bus 122 on which data, address and/or control signals are coupled away from or toward the memory controller 124. The system memory 120 includes a plurality of memory devices 130 coupled to the system memory bus 122, and further includes write buffers 132 and read data buffers 134 also coupled to the system memory bus 122. As with typical computer systems, the system memory 120 is used to store information, typically data or instructions, for use by the rest of the computer system 100, such as, the processor 102, the graphics controller 110, input or output devices 114, 116, and the like. However, the system memory 120 shown in FIG. 1 is an "intelligent" memory system that can monitor the types of memory requests issued by the memory controller 124, for example, read requests or write requests, as well as alter the order in which the memory requests are executed from the order in which the memory requests are issued by the memory controller 124. Additionally, the system memory 120 can also modify the flow of read data provided to the memory controller 124 from the order in which the read data is requested by the memory controller 124. The reordering of the memory requests as well as the return read data is made to improve utilization of the system memory bus 122. Handling of the memory requests and read data is facilitated by the use of the write buffer 132 and the read data buffer 134 included in the system memory 120. For example, the write buffer 132 and the read data buffer 134 are used to temporarily store write requests and read data, respectively, in the memory system 120 until a sufficient number of write requests are ready for servicing or until the appropriate time for transferring read data to the memory controller 124.

Further included in the system memory 120 is a memory request response circuit 140 for monitoring the servicing of memory requests issued by the memory request queue 204. In response to the servicing of a memory request, an appropriate response signal is generated by the memory request response circuit 140. For example, when a read request issued to the system memory 120 is serviced, and read data is ready to be provided to the memory controller 124, the memory request response circuit 140 generates a read response signal that includes the read data signals as well as a read status signal that identifies the read request corresponding to the read data. With respect to a write request that has been serviced by the system memory 120, the memory request response circuit 140 generates a write response signal that includes a write status signal indicating that the particular write request has been serviced by the system memory 120. As will be explained in more detail below, the response signals generated by the memory request response circuit are used by the memory controller 124 to monitor the number of outstanding memory requests issued to the system memory 120. Although in the embodiment described with respect to FIG. 1 the system memory 120 includes a memory request response circuit 140 to provide response signals to the memory controller 124, it will be appreciated that alternative approaches known in the art can be used to report the servicing of read and write requests to the memory controller 124. In the interest of brevity, such alternative approaches will not be discussed herein.

An example of a memory system that can be used for the system memory 120 is described in more detail in commonly assigned U.S. patent application Ser. No. 10/232,473, entitled METHOD AND SYSTEM FOR CONTROLLING MEMORY ACCESSES TO MEMORY MODULES HAVING A MEMORY HUB ARCHITECTURE and filed Aug. 29, 2002 and U.S. patent application Ser. No. 10/690,810. It will be appreciated by those ordinarily skilled in the art, however, that alternative system memories having buffers for storing memory requests and data can be substituted for the system memory 120 as well, and embodiments of the present invention can be utilized therewith without departing from the scope of the present invention.

Figure 2:
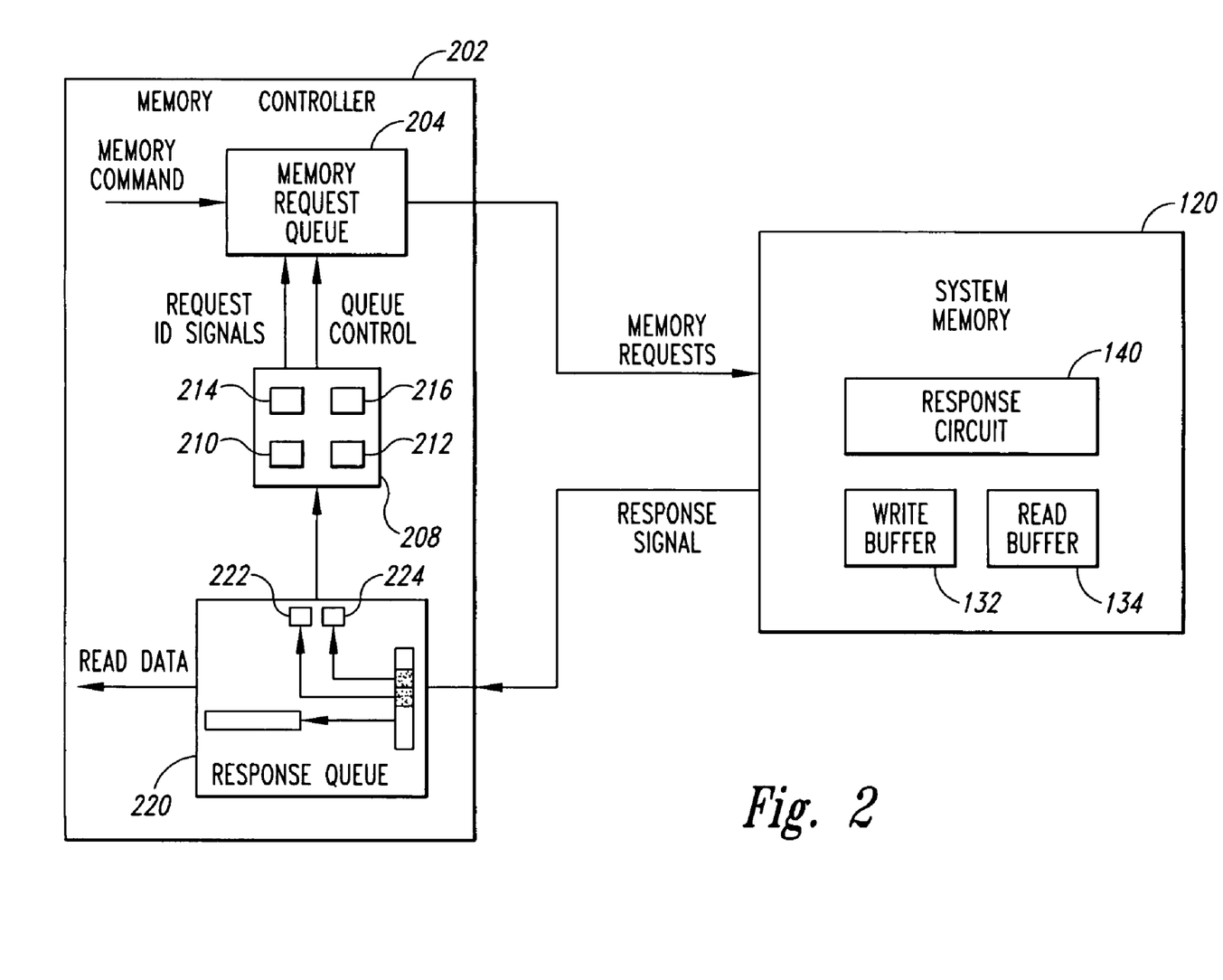
FIG. 2 is a partial block diagram of a memory controller according to an embodiment of the present invention.

FIG. 2 illustrates a portion memory controller 202 according to an embodiment of the present invention. The memory controller 202 can be substituted for the memory controller 124 shown in FIG. 1. The memory controller 202 includes a memory request queue 204 that receives from the processor 104 (FIG. 1) via the system controller 108 high level memory request signals, including command signals, address signals and, in the case of a memory write, write data signals. The memory request queue 204 also receives Request ID signals from a flow control unit 208 that uniquely identify each memory request. These Request IDs are combined with corresponding high level memory requests and stored in the memory request queue 204, preferably in the order they are received. The memory request signals stored in the request queue 204 include both read request signals and write request signals. The high level memory request signals and the Request ID signals will collectively be referred to as memory request signals.

The memory controller 202 also includes a memory response queue 220 that receives read response signals and write response signals from the system memory 120. As previously discussed, the read response signals include read data signals as well as read status signals that identify the read request corresponding to the read data. The write response signals include write status signals that identify a write request that has been serviced by one of the memory modules. The response signals are generated by a memory request response circuit 140 (FIG. 1) included in the system memory 120 to allow the memory controller 202 to monitor the number of outstanding read and write requests that have been issued to the system memory 120.

The memory response queue 220 couples read status signals 222 and write status signals 224 to the flow control unit 208 so the flow control unit 208 can determine which read requests and which write requests have been serviced by the system memory 120. The flow control unit 208 makes this determination by comparing the status signals 222, 224 to the Request IDs generated and coupled to the memory request queue 204. As shown in FIG. 2, the flow control unit 208 includes read and write buffer control circuits 210, 212, which are used for independently monitoring the number of outstanding read and write requests issued to the system memory 120, respectively. As will be described in more detail below, the flow control unit 208 outputs flow control signals based on the number of outstanding read and write requests to the memory request queue 204 to control whether and when additional read or write requests should be issued to the system memory 120.

In one embodiment of the present invention, the read buffer control circuit 210 and the write buffer control circuit 212 include up/down counter circuits 214, 216 for monitoring outstanding read and write requests issued to the system memory 120. The counter circuit 214 is incremented by the flow control unit 208 in response to the issuance of a read request to the system memory 120, and is decremented in response to the receipt of a read status signal 222 for the corresponding read request. In this manner, the value of the counter circuit 214 is indicative of the number of outstanding read requests issued to the system memory 120. The counter circuit 216 is used to monitor the number of outstanding write requests in the same manner as previously described with respect to the counter circuit 214 for monitoring the outstanding read requests. Although using the counter circuits 214 and 216 has been described, it will be appreciated, however, that those ordinarily skilled in the art will obtain sufficient understanding from the description provided herein to implement embodiments of the present invention using circuits other than counter circuits 214, 216. Consequently, the scope of the present invention is not limited to the particular embodiment described with respect to FIG. 2.

In operation, the flow control unit 208 monitors the number of outstanding read and write requests through the use of the read and write buffer control circuits 210, 212, and the up/down counter circuits 214 and 216. In response to the number of outstanding memory requests, the flow control unit 208 outputs flow control signals to halt or resume further issuance of read or write requests to the system memory 120. In this manner, the flow control unit 208 can prevent overrunning the posted write buffers 132 and the read data buffers 134 of the memory system 120. Additionally, allowing for the number of outstanding read requests before halting further issuance of read requests to be different than the number of outstanding write requests before halting further issuance of write requests provides the flexibility to accommodate differences in buffer management between read and write requests. For example, it is generally the case that a large number of outstanding write requests issued to the system memory 120 is acceptable, and in some cases, preferable, whereas the number of outstanding read requests issued to the system memory 120 is preferably minimized.

Preferably, the read buffer control circuit 210 stores a programmable read request limit that defines the number of outstanding read requests that may be issued to the system memory 120 before the flow control unit 208 outputs a control signal to the memory request queue 204 halting further issuance of read requests. Similarly the write buffer control circuit 212 stores a programmable write request limit that defines the number of outstanding write requests that may be issued to the system memory 120 before the flow control unit 208 outputs a control signal to halt further issuance of write requests.

During the time issuance of the read or write requests are tolled, outstanding memory requests issued to the system memory 120 are allowed to be serviced, and consequently, clear room in the write buffer and the read data buffer of the system memory 120. With respect to read requests, when the number of outstanding read requests decreases below a programmable read resume limit stored by the read buffer control circuit 210, the flow control unit 208 outputs flow control signals to resume issuance of read requests to the system memory 120. Similarly, with respect to write requests, a programmable write resume limit stored by the write buffer control circuit 212 governs the number of write requests that can be outstanding before resuming the further issuance of write requests to the system memory 120.

Although the read and write request limits, and the read and write resume limit have been previously described as being programmable, it will be appreciated that the read and write request limits and the read and write resume limits can be a fixed value as well. As previously mentioned, programmable read and write buffer limits programmed into the read and write buffer control circuits 210, 212 allow for the buffer control to be tailored for the particular type of memory request, that is, either read requests or write requests, as well as to allow values to be selected that are indicative of the allowable read and write buffer depths of the system memory 120. It will be appreciated that in alternative embodiments, rather than have non-zero read and write resume limits, issuance of read or write requests can resume when the number of outstanding read or write requests decrease to zero.

FIG. 2 illustrates a portion memory controller 202 according to an embodiment of the present invention. The memory controller 202 can be substituted for the memory controller 124 shown in FIG. 1. The memory controller 202 includes a memory request queue 204 that receives from the processor 104 (FIG. 1) via the system controller 108 high level memory request signals, including command signals, address signals and, in the case of a memory write, write data signals. The memory request queue 204 also receives Request ID signals from a flow control unit 208 that uniquely identify each memory request. These Request IDs are combined with corresponding high level memory requests and stored in the memory request queue 204, preferably in the order they are received. The memory request signals stored in the request queue 204 include both read request signals and write request signals. The high level memory request signals and the Request ID signals will collectively be referred to as memory request signals. As previously described with respect to FIG. 2, the flow control circuit 208 of the memory controller 202 included read and write buffer control circuits 210, 212 to monitor the number of outstanding read and write requests issued to the system memory 120. In an alternative embodiment of the present invention, shown in FIG. 3, the memory controller 302 includes a plurality of read buffer control circuits 310a–d and a plurality of write buffer control circuits 312a–d. Each of the read buffer control circuits 310a–d has a programmable read request limit and a programmable read resume limit, and each of the write buffer control circuits has a programmable write request limit and a programmable write resume limit. Each of the read buffer control circuits 310a–d can be used to individually monitor a corresponding read data buffer in the system memory 120. Similarly, each of the write buffer control circuits 312a–d can be used to individually monitor a corresponding write buffer in the system memory 120. In contrast, the memory controller 202 described with respect to FIG. 2 monitored the total number of outstanding read requests issued to the system memory 120 using the read buffer control circuit 210 and further monitored the total number of outstanding write requests issued to the system memory 120 using the write buffer control circuit 212.

Figure 3:
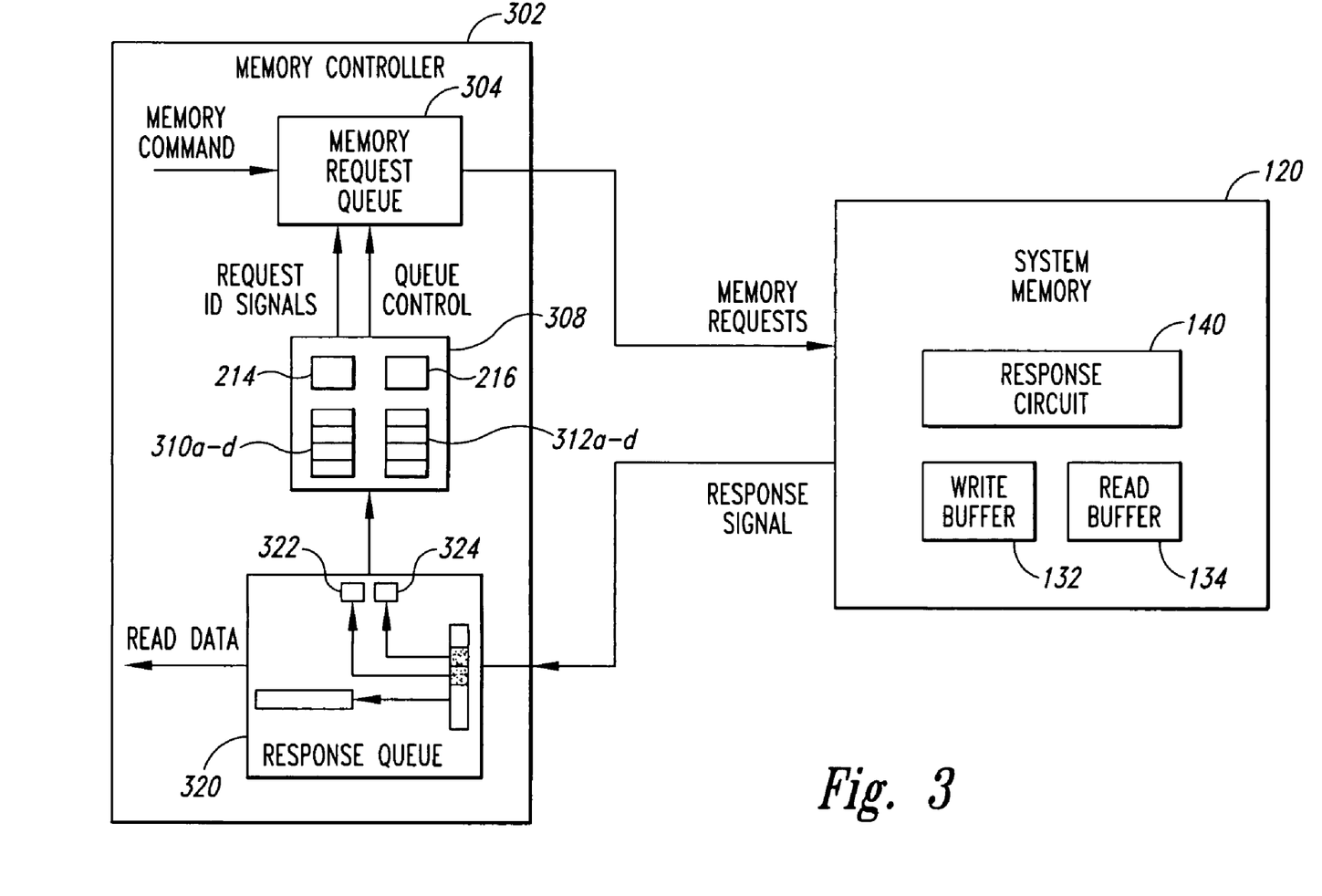
FIG. 3 is a partial block diagram of a memory controller according to an alternative embodiment of the present invention.

As with the embodiment of the memory controller 202 described with reference to FIG. 2, the individual read and write request limits, and the individual read and write resume limits for the memory controller 302 can be fixed rather than programmable, or alternatively, some combination of fixed and programmable values. Moreover, the read and write buffer control circuits 310a–d, 312a–d can be implemented using counter circuits, as previously described with respect to the memory controller 202. Alternatively, those ordinarily skilled in the art will obtain sufficient understanding from the description provided herein to practice the invention using other well known or later developed designs and circuits. Consequently, the scope of the present invention should not be limited to any of the particular embodiments described herein, or to the use of any particular circuits described with respect to those embodiments.

Figure 4:
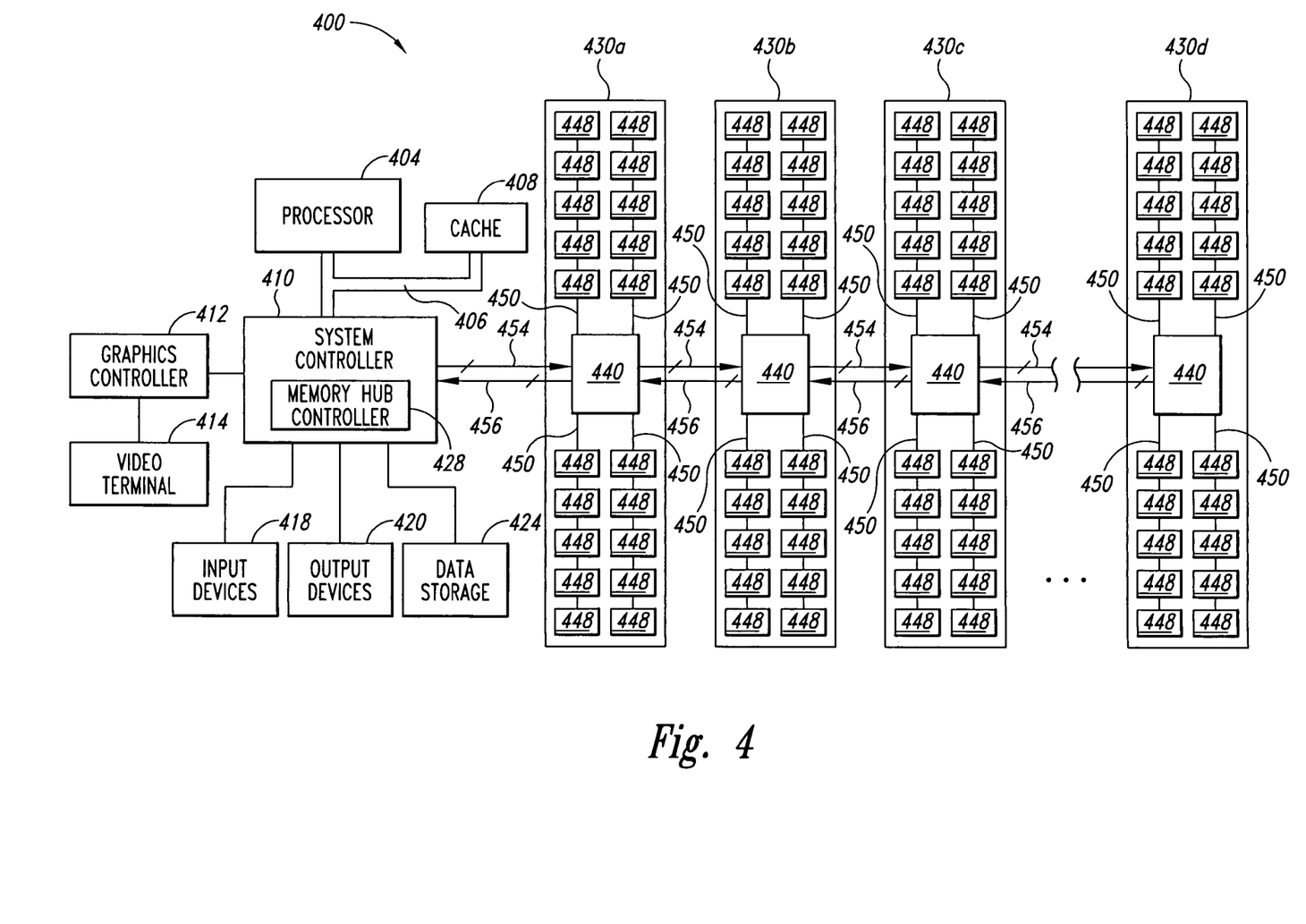
FIG. 4 is a partial block diagram of a computer system having a memory hub based system memory in which embodiments of the present invention can be implemented.

FIG. 4 illustrates a computer system 400 having a memory hub architecture in which embodiments of the present invention can be utilized. The computer system 400 includes a processor 404 for performing various computing functions, such as executing specific software to perform specific calculations or tasks. The processor 404 includes a processor bus 406 that normally includes an address bus, a control bus, and a data bus. The processor bus 406 is typically coupled to cache memory 408, which, is typically static random access memory ("SRAM"). Finally, the processor bus 406 is coupled to a system controller 410, which is also sometimes referred to as a bus bridge.

The system controller 410 also serves as a communications path to the processor 404 for a variety of other components. More specifically, the system controller 410 includes a graphics port that is typically coupled to a graphics controller 412, which is, in turn, coupled to a video terminal 414. The system controller 410 is also coupled to one or more input devices 418, such as a keyboard or a mouse, to allow an operator to interface with the computer system 400. Typically, the computer system 400 also includes one or more output devices 420, such as a printer, coupled to the processor 404 through the system controller 410. One or more data storage devices 424 are also typically coupled to the processor 404 through the system controller 410 to allow the processor 404 to store data or retrieve data from internal or external storage media (not shown). Examples of typical storage devices 424 include hard and floppy disks, tape cassettes, and compact disk read-only memories (CD-ROMs).

The system controller 410 contains a memory hub controller 428 coupled to several memory modules 430a–n through a bus system 454,456. Each of the memory modules 430a–n includes a memory hub 440 coupled to several memory devices 448 through command, address and data buses, collectively shown as bus 450. The memory hub 440 efficiently routes memory requests and responses between the controller 428 and the memory devices 448. Each of the memory hubs 440 includes write buffers and read data buffers, as previously described. Computer systems employing this architecture allow for the processor 404 to access one memory module 430a–n while another memory module 430a–n is responding to a prior memory request. For example, the processor 404 can output write data to one of the memory modules 430a–n in the system while another memory module 430a–n in the system is preparing to provide read data to the processor 404. Additionally, a memory hub architecture can also provide greatly increased memory capacity in computer systems.

The memory hub controller 428 includes circuits according to an embodiment of the present invention. That is, outstanding read and write requests are independently monitored, and in response to the number of outstanding read and write requests, the further issuance of read or write requests can be halted until the number of outstanding read or write requests decreases below a resume limit, at which time, issuance of the read or write requests to the memory may resume. In this manner, separate monitoring and control over the issuance of read requests and monitoring and control over the issuance of write requests to the system memory allows for independent buffer control.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A memory hub controller for controlling access to a system memory, comprising:
   a memory request queue storing at least one memory request received through an input port, the memory request queue being operable to issue from an output port each memory request stored in the memory request queue responsive to a flow control signal;
   a response queue coupled to receive through an input port read responses containing each read data and a read status signal identifying read requests corresponding to the read data, the response queue further being coupled to receive through the input port write responses each having a write status signal identifying write requests that have been serviced, the response queue being operable to couple at least the read data from each read response signal to a data output port and to couple the read status signal from each read response and the write status signal from each write response to a flow control port; and
   a buffer management unit coupled to receive the read status signals and the write status signals from the response queue, the buffer management unit having a read buffer monitor circuit to determine from the read status signals a number of outstanding read requests issued by the memory request queue and having a write buffer monitor circuit to determine from the write status signals a number of outstanding write requests issued by the memory request queue, the buffer management unit further having a flow control circuit coupled to the read and write buffer monitor circuits to generate a flow control signal provided to the memory request queue controlling issuance of read and write requests to the memory modules based on the numbers of outstanding read and write requests, respectively, issued by the memory request queue.

2. The memory hub controller of claim 1 wherein the flow control circuit of the buffer management unit comprises a control circuit operable to generate a flow control signal halting issuance of read requests to the system memory in response to the read buffer monitor circuit determining the number of outstanding read requests exceeds a read request threshold and further operable to generate a flow control signal halting issuance of write requests to the system memory in response to the write buffer monitor circuit determining the number of outstanding write requests exceeds a write request threshold.

3. The memory hub controller of claim 2 wherein the read request threshold and the write request threshold are unequal.

4. The memory hub controller of claim 2 wherein the write request threshold is greater than the read request threshold.

5. The memory hub controller of claim 2 wherein the control circuit is further operable to generate a flow control signal resuming issuance of read requests to the system memory in response to the read buffer monitor circuit determining the number of outstanding read requests is less than a read request resume threshold and further operable to generate a flow control signal resuming issuance of write requests to the system memory in response to the write buffer monitor circuit determining the number of outstanding write requests is less than a write request resume threshold.

6. The memory hub controller of claim 2 wherein the control circuit is further operable to generate a flow control signal resuming issuance of read requests to the system memory in response to the read buffer monitor circuit determining the number of outstanding read requests issued to the system memory is zero.

7. The memory hub controller of claim 2 wherein the control circuit is further operable to generate a flow control signal resuming issuance of write requests to the system memory in response to the write buffer monitor circuit determining the number of outstanding write requests issued to the system memory is zero.

8. The memory hub controller of claim 1 wherein the memory request queue is further operable to issue from the output port along with each memory request a request identification uniquely identifying the respective memory request.

9. The memory hub controller of claim 8 wherein the buffer management unit is operable to generate and couple to the memory request queue the request identification for each memory request, and wherein the buffer management unit is further operable to generate the flow control signal on the basis of a comparison between the request identification coupled to the memory request queue and the read status signals and the write status signals received from the response queue.

10. A memory controller coupled to a system memory through a memory bus, comprising:

a memory request queue to receive and store memory requests, the memory request queue issuing read requests and write requests to the system memory in response to a flow control signal;

a response queue coupled to receive a memory request response having a status signal identifying read requests and write requests that have been serviced by the system memory; and a memory request flow control circuit coupled to the response queue to receive the status signals and having separate read and write request monitor circuits to monitor a number of outstanding read requests and a number of outstanding write requests issued to the system memory, respectively, the memory request flow control circuit coupled to the memory request queue to provide the flow control signal responsive to the number of outstanding read and write requests to separately control issuance of read requests and issuance of write requests to the system memory.

11. The memory controller of claim 10 wherein the memory request flow control circuit comprises a control circuit operable to generate a flow control signal halting issuance of read requests to the system memory in response to the read request monitor circuit determining the number of outstanding read requests exceeds a read request threshold and further operable to generate a flow control signal halting issuance of write requests to the system memory in response to the write request monitor circuit determining the number of outstanding write requests exceeds a write request threshold.

12. The memory controller of claim 11 wherein the read request threshold and the write request threshold are unequal.

13. The memory controller of claim 11 wherein the write request threshold is greater than the read request threshold.

14. The memory controller of claim 11 wherein the control circuit is further operable to generate a flow control signal resuming issuance of read requests to the system memory in response to the read request monitor circuit determining the number of outstanding read requests is less than a read request resume threshold and further operable to generate a flow control signal resuming issuance of write requests to the system memory in response to the write request monitor circuit determining the number of outstanding write requests is less than a write request resume threshold.

15. The memory controller of claim 11 wherein the control circuit is further operable to generate a flow control signal resuming issuance of read requests to the system memory in response to the read request monitor circuit determining the number of outstanding read requests issued to the system memory is zero.

16. The memory controller of claim 11 wherein the control circuit is further operable to generate a flow control signal resuming issuance of write requests to the system memory in response to the write request monitor circuit determining the number of outstanding write requests issued to the system memory is zero.

17. The memory controller of claim 10 wherein the memory request queue is further operable to issue along with each memory request a request identification uniquely identifying the respective memory request.

18. The memory controller of claim 17 wherein the memory request flow control circuit is operable to generate and couple to the memory request queue the request identification for each memory request, and wherein the memory request flow control circuit is further operable to generate the flow control signal on the basis of a comparison between the request identification coupled to the memory request queue and the read status signals and the write status signals received from the response queue.

19. A memory hub controller for controlling access to a system memory, comprising:

a memory request queue storing read and write memory requests and being operable to issue to the system memory the read and write memory requests stored in the memory request queue responsive to read and write request flow control signals received at a queue control terminal;

a response queue coupled to receive from the system memory read responses each having a read status signal identifying read requests that have been serviced and to receive write responses each having a write status signal identifying write requests that have been serviced, the response queue being operable to couple the read status signal from each read response and the write status signal from each write response to a flow control port; and a buffer management unit coupled to the queue control terminal of the memory request queue and further coupled to the flow control port of the response queue, the buffer management unit operable to determine from the read status signals a number of outstanding read requests issued by the memory request queue and to determine from the write status signals a number of outstanding write requests issued by the memory request queue, and in response to the numbers of outstanding read and write requests, generate flow control signals to separately control issuance of read requests and issuance of write requests by the memory request queue to the system memory.

20. The memory hub controller of claim 19 wherein the buffer management unit comprises a flow control circuit operable to generate a flow control signal halting issuance of read requests to the system memory in response to determining the number of outstanding read requests exceeds a read request threshold and further operable to generate a flow control signal resuming issuance of read requests to the system memory in response to determining the number of outstanding read requests is less than a read request resume threshold.

21. The memory hub controller of claim 19 wherein the buffer management unit comprises a flow control circuit operable to generate a flow control signal halting issuance of write requests to the system memory in response to determining the number of outstanding write requests exceeds a write request threshold and further operable to generate a flow control signal resuming issuance of write requests to the system memory in response to determining the number of outstanding write requests is less than a write request resume threshold.

22. The memory hub controller of claim 19 wherein the memory request queue is further operable to issue along with each memory request a request identification uniquely identifying the respective memory request.

23. The memory hub controller of claim 22 wherein the buffer management unit is operable to generate and couple to the memory request queue the request identification for each memory request, and wherein the buffer management unit is further operable to generate the flow control signal on the basis of a comparison between the request identification coupled to the memory request queue and the read status signals and the write status signals received from the response queue.

24. A memory system, comprising:
a memory bus for transmitting memory requests and responses thereon;
a plurality of memory modules coupled to the memory bus, each of the modules having:
a plurality of memory devices;
a memory hub coupled to the plurality of devices and the memory bus for receiving memory requests and generating signals in response thereto to operate the plurality of memory devices and service read and write requests, the memory hub including a memory write buffer coupled to the memory bus to store write requests, a memory read queue coupled to the memory devices to receive read data from the memory devices and store the read data for coupling to the memory bus, and further including a response generator to generate a read response including a read status signal identifying read requests corresponding to the read data and to generate a write response including a write status signal identifying write requests that have been serviced; and
a memory controller coupled to the memory bus, the memory controller having:
a memory request queue storing at least one memory request and operable to issue from an output port to the memory modules each memory request stored in the memory request queue responsive to a flow control signal;
a response queue coupled to receive the read responses and write responses, the response queue being operable to couple at least the read data from each read response signal to a data output port and to couple the read status signal from each read response and the write status signal from each write response to a flow control port; and
a buffer management unit coupled to receive the read status signals and the write status signals from the response queue, the buffer management unit having a read buffer monitor circuit to determine from the read status signals a number of outstanding read requests issued by the memory request queue and having a write buffer monitor circuit to determine from the write status signals a number of outstanding write requests issued by the memory request queue, the buffer management unit further having a flow control circuit coupled to the read and write buffer monitor circuits to generate a flow control signal provided to the memory request queue controlling issuance of read and write requests to the memory modules based on the numbers of outstanding read and write requests, respectively, issued by the memory request queue.

25. The memory system of claim 24 wherein the flow control circuit of the buffer management unit comprises a control circuit operable to generate a flow control signal halting issuance of read requests to the system memory in response to the read buffer monitor circuit determining the number of outstanding read requests exceeds a read request threshold and further operable to generate a flow control signal halting issuance of write requests to the system memory in response to the write buffer monitor circuit determining the number of outstanding write requests exceeds a write request threshold.

26. The memory system of claim 25 wherein the read request threshold and the write request threshold are unequal.

27. The memory system of claim 25 wherein the write request threshold is greater than the read request threshold.

28. The memory system of claim 25 wherein the control circuit is further operable to generate a flow control signal resuming issuance of read requests to the system memory in response to the read buffer monitor circuit determining the number of outstanding read requests is less than a read request resume threshold and further operable to generate a flow control signal resuming issuance of write requests to the system memory in response to the write buffer monitor circuit determining the number of outstanding write requests is less than a write request resume threshold.

29. The memory system of claim 25 wherein the control circuit is further operable to generate a flow control signal resuming issuance of read requests to the system memory in response to the read buffer monitor circuit determining the number of outstanding read requests issued to the system memory is zero.

30. The memory system of claim 25 wherein the control circuit is further operable to generate a flow control signal resuming issuance of write requests to the system memory in response to the write buffer monitor circuit determining the number of outstanding write requests issued to the system memory is zero.

31. The memory system of claim 24 wherein the memory request queue is further operable to issue from the output port along with each memory request a request identification uniquely identifying the respective memory request.

32. The memory system of claim 31 wherein the buffer management unit is operable to generate and couple to the memory request queue the request identification for each memory request, and wherein the buffer management unit is further operable to generate the flow control signal on the basis of a comparison between the request identification coupled to the memory request queue and the read status signals and the write status signals received from the response queue.

33. A memory system, comprising:
a memory bus for transmitting memory requests and responses thereon;
a system memory having a plurality of memory modules coupled to the memory bus, each of the modules having:
a plurality of memory devices;
a memory hub coupled to the plurality of devices and the memory bus for receiving memory requests and generating signals in response thereto to operate the plurality of memory devices and service read and write requests, the memory hub including a memory write buffer coupled to the memory bus to store write requests, a memory read queue coupled to the memory devices to receive read data from the memory devices and store the read data for coupling to the memory bus, and further including a response generator to generate a read response including a read status signal identifying read requests corresponding to the read data and to generate a write response including a write status signal identifying write requests that have been serviced; and
a memory controller coupled to the system memory through the memory bus, the memory controller having:
a memory request queue to receive and store memory requests, the memory request queue issuing read requests and write requests to the system memory in response to a flow control signal;

a response queue coupled to receive a memory request response having a status signal identifying read requests and write requests that have been serviced by the system memory; and a memory request flow control circuit coupled to the response queue to receive the status signals and having separate read and write request monitor circuits to monitor a number of outstanding read requests and a number of outstanding write requests issued to the system memory, respectively, the memory request flow control circuit coupled to the memory request queue to provide the flow control signal responsive to the number of outstanding read and write requests to separately control issuance of read requests and issuance of write requests to the system memory.

34. The memory system of claim 33 wherein the memory request flow control circuit comprises a control circuit operable to generate a flow control signal halting issuance of read requests to the system memory in response to the read request monitor circuit determining the number of outstanding read requests exceeds a read request threshold and further operable to generate a flow control signal halting issuance of write requests to the system memory in response to the write request monitor circuit determining the number of outstanding write requests exceeds a write request threshold.

35. The memory system of claim 34 wherein the read request threshold and the write request threshold are unequal.

36. The memory system of claim 34 wherein the write request threshold is greater than the read request threshold.

37. The memory system of claim 34 wherein the control circuit is further operable to generate a flow control signal resuming issuance of read requests to the system memory in response to the read request monitor circuit determining the number of outstanding read requests is less than a read request resume threshold and further operable to generate a flow control signal resuming issuance of write requests to the system memory in response to the write request monitor circuit determining the number of outstanding write requests is less than a write request resume threshold.

38. The memory system of claim 34 wherein the control circuit is further operable to generate a flow control signal resuming issuance of read requests to the system memory in response to the read request monitor circuit determining the number of outstanding read requests issued to the system memory is zero.

39. The memory system of claim 34 wherein the control circuit is further operable to generate a flow control signal resuming issuance of write requests to the system memory in response to the write request monitor circuit determining the number of outstanding write requests issued to the system memory is zero.

40. The memory system of claim 33 wherein the memory request queue is further operable to issue along with each memory request a request identification uniquely identifying the respective memory request.

41. The memory system of claim 40 wherein the memory request flow control circuit is operable to generate and couple to the memory request queue the request identification for each memory request, and wherein the memory request flow control circuit is further operable to generate the flow control signal on the basis of a comparison between the request identification coupled to the memory request queue and the read status signals and the write status signals received from the response queue.

42. A processor-based system, comprising:

a processor having a processor bus;

a system controller coupled to the processor bus, the system controller having a peripheral device port, the system controller further comprising a controller coupled to a system memory port;

at least one input device coupled to the peripheral device port of the system controller;

at least one output device coupled to the peripheral device port of the system controller;

at least one data storage device coupled to the peripheral device port of the system controller; and a memory system, comprising:

a memory bus for transmitting memory requests and responses thereon;

a plurality of memory modules coupled to the memory bus, each of the modules having:

a plurality of memory devices;

a memory hub coupled to the plurality of devices and the memory bus for receiving memory requests and generating signals in response thereto to operate the plurality of memory devices and service read and write requests, the memory hub including a memory write buffer coupled to the memory bus to store write requests, a memory read queue coupled to the memory devices to receive read data from the memory devices and store the read data for coupling to the memory bus, and further including a response generator to generate a read response including a read status signal identifying read requests corresponding to the read data and to generate a write response including a write status signal identifying write requests that have been serviced; and a memory controller coupled to the memory bus, the memory controller having:

a memory request queue storing at least one memory request and operable to issue from an output port to the memory modules each memory request stored in the memory request queue responsive to a flow control signal;

a response queue coupled to receive the read responses and write responses, the response queue being operable to couple at least the read data from each read response signal to a data output port and to couple the read status signal from each read response and the write status signal from each write response to a flow control port; and a buffer management unit coupled to receive the read status signals and the write status signals from the response queue, the buffer management unit having a read buffer monitor circuit to determine from the read status signals a number of outstanding read requests issued by the memory request queue and having a write buffer monitor circuit to determine from the write status signals a number of outstanding write requests issued by the memory request queue, the buffer management unit further having a flow control circuit coupled to the read and write buffer monitor circuits to generate a flow control signal provided to the memory request queue controlling issuance of read requests to the memory modules based on the number of outstanding read requests issued by the memory request queue and controlling issuance of write requests to the system memory based on the number of outstanding write requests issued by the memory request queue.

43. The processor-based system of claim 42 wherein the flow control circuit of the buffer management unit comprises a control circuit operable to generate a flow control signal halting issuance of read requests to the system memory in response to the read buffer monitor circuit determining the number of outstanding read requests exceeds a read request threshold and further operable to generate a flow control signal halting issuance of write requests to the system memory in response to the write buffer monitor circuit determining the number of outstanding write requests exceeds a write request threshold.

44. The processor-based system of claim 43 wherein the read request threshold and the write request threshold are unequal.

45. The processor-based system of claim 43 wherein the write request threshold is greater than the read request threshold.

46. The processor-based system of claim 43 wherein the control circuit is further operable to generate a flow control signal resuming issuance of read requests to the system memory in response to the read buffer monitor circuit determining the number of outstanding read requests is less than a read request resume threshold and further operable to generate a flow control signal resuming issuance of write requests to the system memory in response to the write buffer monitor circuit determining the number of outstanding write requests is less than a write request resume threshold.

47. The processor-based system of claim 43 wherein the control circuit is further operable to generate a flow control signal resuming issuance of read requests to the system memory in response to the read buffer monitor circuit determining the number of outstanding read requests issued to the system memory is zero.

48. The processor-based system of claim 43 wherein the control circuit is further operable to generate a flow control signal resuming issuance of write requests to the system memory in response to the write buffer monitor circuit determining the number of outstanding write requests issued to the system memory is zero.

49. The processor-based system of claim 42 wherein the memory request queue is further operable to issue from the output port along with each memory request a request identification uniquely identifying the respective memory request.

50. The processor-based system of claim 49 wherein the buffer management unit is operable to generate and couple to the memory request queue the request identification for each memory request, and wherein the buffer management unit is further operable to generate the flow control signal on the basis of a comparison between the request identification coupled to the memory request queue and the read status signals and the write status signals received from the response queue.

51. A processor-based system, comprising:
a processor having a processor bus;
a system controller coupled to the processor bus, the system controller having a peripheral device port, the system controller further comprising a controller coupled to a system memory port;
at least one input device coupled to the peripheral device port of the system controller;
at least one output device coupled to the peripheral device port of the system controller;
at least one data storage device coupled to the peripheral device port of the system controller; and
a memory system, comprising:
a memory bus for transmitting memory requests and responses thereon;
a system memory having a plurality of memory modules coupled to the memory bus, each of the modules having:
a plurality of memory devices;
a memory hub coupled to the plurality of devices and the memory bus for receiving memory requests and generating signals in response thereto to operate the plurality of memory devices and service read and write requests, the memory hub including a memory write buffer coupled to the memory bus to store write requests, a memory read queue coupled to the memory devices to receive read data from the memory devices and store the read data for coupling to the memory bus, and further including a response generator to generate a read response including a read status signal identifying read requests corresponding to the read data and to generate a write response including a write status signal identifying write requests that have been serviced; and
a memory controller coupled to the system memory through the memory bus, the memory controller having:
a memory request queue to receive and store memory requests, the memory request queue issuing read requests and write requests to the system memory in response to a flow control signal;
a response queue coupled to receive a memory request response having a status signal identifying read requests and write requests that have been serviced by the system memory; and
a memory request flow control circuit coupled to the response queue to receive the status signals and having separate read and write request monitor circuits to monitor a number of outstanding read requests and a number of outstanding write requests issued to the system memory, respectively, the memory request flow control circuit coupled to the memory request queue to provide the flow control signal responsive to the number of outstanding read and write requests to separately control issuance of read requests and issuance of write requests to the system memory.

52. The processor-based system of claim 51 wherein the memory request flow control circuit comprises a control circuit operable to generate a flow control signal halting issuance of read requests to the system memory in response to the read request monitor circuit determining the number of outstanding read requests exceeds a read request threshold and further operable to generate a flow control signal halting issuance of write requests to the system memory in response to the write request monitor circuit determining the number of outstanding write requests exceeds a write request threshold.

53. The processor-based system of claim 52 wherein the read request threshold and the write request threshold are unequal.

54. The processor-based system of claim 52 wherein the write request threshold is greater than the read request threshold.

55. The processor-based system of claim 52 wherein the control circuit is further operable to generate a flow control signal resuming issuance of read requests to the system memory in response to the read request monitor circuit determining the number of outstanding read requests is less than a read request resume threshold and further operable to generate a flow control signal resuming issuance of write requests to the system memory in response to the write request monitor circuit determining the number of outstanding write requests is less than a write request resume threshold.

56. The processor-based system of claim 52 wherein the control circuit is further operable to generate a flow control signal resuming issuance of read requests to the system memory in response to the read request monitor circuit determining the number of outstanding read requests issued to the system memory is zero.

57. The processor-based system of claim 52 wherein the control circuit is further operable to generate a flow control signal resuming issuance of write requests to the system memory in response to the write request monitor circuit determining the number of outstanding write requests issued to the system memory is zero.

58. The processor-based system of claim 51 wherein the memory request queue is further operable to issue along with each memory request a request identification uniquely identifying the respective memory request.

59. The processor-based system of claim 58 wherein the memory request flow control circuit is operable to generate and couple to the memory request queue the request identification for each memory request, and wherein the memory request flow control circuit is further operable to generate the flow control signal on the basis of a comparison between the request identification coupled to the memory request queue and the read status signals and the write status signals received from the response queue.

60. A method for managing issuance of read and write requests to a system memory, comprising:
   separately monitoring a number of outstanding read requests and a number of outstanding write requests issued to the system memory;
   separately controlling further issuance of read and write requests to the system memory based on the numbers of outstanding read and write requests, respectively.

61. The method of claim 60 wherein separately controlling further issuance of read and write requests to the system memory based on the number of outstanding read and write requests comprises halting further issuance of read requests in response to the number of outstanding read requests exceeds a read request threshold and halting further issuance of write requests in response to the number of outstanding write requests exceeds a write request threshold.

62. The method of claim 61 wherein the read request threshold and the write request threshold are unequal.

63. The method of claim 62 wherein the write request threshold is greater than the read request threshold.

64. The method of claim 61, further comprising resuming issuance of read requests in response to the number of outstanding read requests decreasing to less than a read resume threshold.

65. The method of claim 61, further comprising resuming issuance of write request in response to the number of outstanding write requests decreasing to less than a write resume threshold.

66. The method of claim 60 wherein separately monitoring the number of outstanding read requests and write requests issued to the system memory comprises incrementing a read request counter in response to issuance of a read request and decrementing the read request counter in response to receiving an indication that the corresponding read request has been serviced by the system memory and incrementing a write request counter in response to issuance of a write request and decrementing the write request counter in response to receiving an indication that the corresponding write request has been serviced by the system memory.

67. A method for managing the issuance of read and write requests to a system memory, comprising:
   monitoring a number of outstanding read requests and a number of outstanding write requests issued to the system memory; and
   independently halting and resuming issuance of read requests and write requests to the system memory to maintain the number of outstanding read requests between first and second read thresholds and to maintain the number of outstanding write requests between first and second write thresholds, respectively.

68. The method of claim 67 wherein the first read threshold is greater than the second read threshold and the first write threshold is greater than the second write threshold, and the first write threshold is unequal to the first read threshold.

69. The method of claim 67 wherein resuming issuance of read requests to the system memory comprises resuming issuance of the read requests in response to the number of outstanding read requests being equal to zero.

70. The method of claim 67 wherein resuming issuance of write requests to the system memory comprises resuming issuance of the write requests in response to the number of outstanding write requests being equal to zero.

71. The method of claim 67, further comprising generating for each memory request a request identification uniquely identifying the respective memory request.

72. The method of claim 71 wherein monitoring the number of outstanding read and write requests comprises monitoring the servicing of the particular read and write requests issued to the system memory based on the request identification.

73. The method of claim 67 wherein monitoring the number of outstanding read requests and write requests issued to the system memory comprises incrementing a read request counter in response to issuance of a read request and decrementing the read request counter in response to receiving an indication that the corresponding read request has been serviced by the system memory and incrementing a write request counter in response to issuance of a write request and decrementing the write request counter in response to receiving an indication that the corresponding write request has been serviced by the system memory.

74. A method for managing the issuance of read and write requests to a system memory, comprising:
   monitoring the number of outstanding read requests issued to the system memory;
   halting the issuance of read requests to the system memory in response to the number of outstanding read requests exceeding a read request threshold;
   resuming the issuance of read requests to the system memory in response to the number of outstanding read requests decreasing to less than a read resume threshold;
   monitoring the number of outstanding write requests issued to the system memory;
   halting the issuance of write requests to the system memory in response to the number of outstanding write requests exceeding a write request threshold; and resuming the issuance of write requests to the system memory in response to the number of outstanding write requests decreasing to less than a write resume threshold.

75. The method of claim 74 wherein the read request threshold and the write request threshold are unequal.

76. The method of claim 75 wherein the write request threshold is greater than the read request threshold.

77. The method of claim 74 wherein resuming issuance of read requests to the system memory comprises resuming issuance of the read requests in response to the number of outstanding read requests being equal to zero.

78. The method of claim 74 wherein resuming issuance of write requests to the system memory comprises resuming issuance of the write requests in response to the number of outstanding write requests being equal to zero.

79. The method of claim 74, further comprising generating for each read and write request a request identification uniquely identifying the respective memory request.

80. The method of claim 79 wherein monitoring the number of outstanding read and write requests comprises monitoring the servicing of the particular read and write requests issued to the system memory based on the request identification.

81. The method of claim 74 wherein monitoring the number of outstanding read requests issued to the system memory comprises incrementing a read request counter in response to issuance of a read request and decrementing the read request counter in response to receiving an indication that the corresponding read request has been serviced by the system memory and monitoring the number of outstanding write requests issued to the system memory comprises incrementing a write request counter in response to issuance of a write request and decrementing the write request counter in response to receiving an indication that the corresponding write request has been serviced by the system memory.

* * * * *